United States Patent [19]

Emerle et al.

[11] 4,394,612
[45] Jul. 19, 1983

[54] BATTERY CHARGING CIRCUIT

[75] Inventors: Emil Emerle, Mount Prospect; Alex F. Gawron, Park Ridge, both of Ill.

[73] Assignee: Skil Corporation, Chicago, Ill.

[21] Appl. No.: 336,891

[22] Filed: Jan. 4, 1982

[51] Int. Cl.³ .............................................. H02J 7/04
[52] U.S. Cl. ......................................... 320/31; 320/35
[58] Field of Search ....................... 320/20, 35, 36, 39, 320/40, 43, 57, 59

[56] References Cited

U.S. PATENT DOCUMENTS

| 3,855,516 | 12/1974 | Fairchild | 320/39 |
| 4,140,958 | 2/1979 | Groeschel | 320/39 |
| 4,210,855 | 7/1980 | Harer et al. | 320/35 |
| 4,240,022 | 12/1980 | Kilinskis et al. | 320/35 |
| 4,349,775 | 9/1982 | Kwon et al. | 320/35 |

Primary Examiner—William M. Shoop
Assistant Examiner—Anita M. Ault
Attorney, Agent, or Firm—McDougall, Hersh & Scott

[57] ABSTRACT

The invention relates to a fast charge circuit suitable for use with battery cells which can be charged at a 4C rate. Line voltage is transformed, full wave rectified and applied to the battery pack. A pair of voltage comparators monitor a sensing voltage which is indicative of the charging voltage and the trough voltage of the battery cells. During a "window" when the sensing voltage is less than a predetermined threshold and through voltage exceeds this threshold, the comparators indicate that charging should be terminated. Alternatively, if excessive temperature on the cells is detected or a selected amount of time passes without reaching full charge, fast charging is also terminated. After the fast charging interval trickle charging of the cells is employed to bring the battery pack to full charge and maintain it there.

8 Claims, 2 Drawing Figures

BATTERY CHARGING CIRCUIT

BACKGROUND OF THE INVENTION

This invention relates to battery charging circuits. More specifically, it relates to charging circuits for use with small rechargeable batteries of the type utilized in power tools. Typically, these cells are nickel-cadmium sealed cells and may be charged hundreds of times before replacement is necessary. A further attribute of such cells is that they are capable of accepting very high charge currents when discharged. As the cells reach full charge the charge rate must be reduced to prevent excessive gas evolution which could cause the cells to rupture. In particular the cell parameters of temperature and voltage change dramatically during fast charging and must be monitored in order to insure that the cell is undamaged by the charging process.

In the past, circuits have been proposed which monitor cell temperature and, upon the reaching of a preselected value, discontinue fast charge operation. Similarly, circuits have also been proposed which monitor the voltage of the cell during the fast charge. None of the prior techniques have been entirely satisfactory and safe when it is desired to charge the cells at a high rate such as the 4C charge rate. Generally, the 4C rate may be defined as four times a rate which would charge the cell in one hour.

Where is is desired to utilize 4C charge rates, it is necessary to provide both voltage and temperature cut off to insure safe charging operation over a range of temperature and voltage conditions which may be encountered when such units are recharged by a consumer. At low temperatures voltage is usually the controlling factor for detecting when the fast charge rate should be terminated to prevent cell damaging overcharge. At high temperatures the battery temperature is the controlling factor with cell temperature rising beyond a safe value before overcharging takes place. By providing a circuit with both voltage and temperature cut off it is possible to charge cells at the 4C rate while assuring maximum cell life and consumer safety. For even further protection it is desirable to limit the charge period to a selected value.

It is known to employ fast charge charging circuits with both voltage and temperature cut offs. However, such circuits require that the charging current be periodically interrupted to permit measurement of the trough voltage of the batteries under charge. This interruption is undesirable in a circuit whose primary purpose is to quickly charge the battery pack so that it may be reused in a portable tool as, for example, a drill, saw, etc.

It is accordingly an object of the present invention to provide a fast charging circuit for batteries having at least temperature and voltage cut off and which maintains the 4C charging rate until the occurrence of one of the trigger conditions.

It is a further object of the invention to provide a fast charge circuit which is simple in operation, highly reliable and safe for use by purchasers of small power tools.

Another object of the invention is to provide a battery charging circuit which monitors the trough voltage of the cells without interrupting the charging cycle and terminates charging when the trough voltage exceeds a selected reference voltage.

It is a further object of the invention to provide a fast charge circuit which employs voltage comparators to monitor the trough voltage and the charging voltage whereby the value of the trough voltage can be monitored to determine the state of charge of the cells during appropriate "windows" on the charging voltage waveform.

These and other objects and advantages of the invention will be apparent from the remaining portion of the specification.

DETAILED DESCRIPTION

As indicated in the background portion of the specification, the present invention employs circuitry for detecting the trough voltage and the temperature of the battery cells under charge. The term trough voltage is understood by those skilled in the art to mean the instantaneous open circuit voltage on the cells. This voltage can be measured either by terminating charging current and measuring cell voltage before the cells reach their steady state voltage or by sensing when the charging voltage is less than a value which corresponds to a minimum trough voltage thus permitting measurement of the trough voltage "on the fly" without interrupting the charging operation. The present invention employs the latter technique. When it is desired to charge cells at a fast charge (4C) rate, average or peak voltage sensing cannot be used because the charging voltage on the cells varies with cell temperature, age, charge rate and degree of cell matching. Thus, the requirement that the voltage cut off circuitry utilize trough voltage sensing.

As indicated in the background section, it is necessary that temperature cut off be provided because the trough voltage cut off system may not prevent damage to the cell due to excessive temperature build up during charging under high ambient temperature conditions. For a more complete discussion concerning trough voltages, voltage cut off and temperature cut off, see "Nickel-Cadmium Battery Application Engineering Handbook", General Electric Company, and particularly sections 4.6–4.9 thereof.

Figure 1:
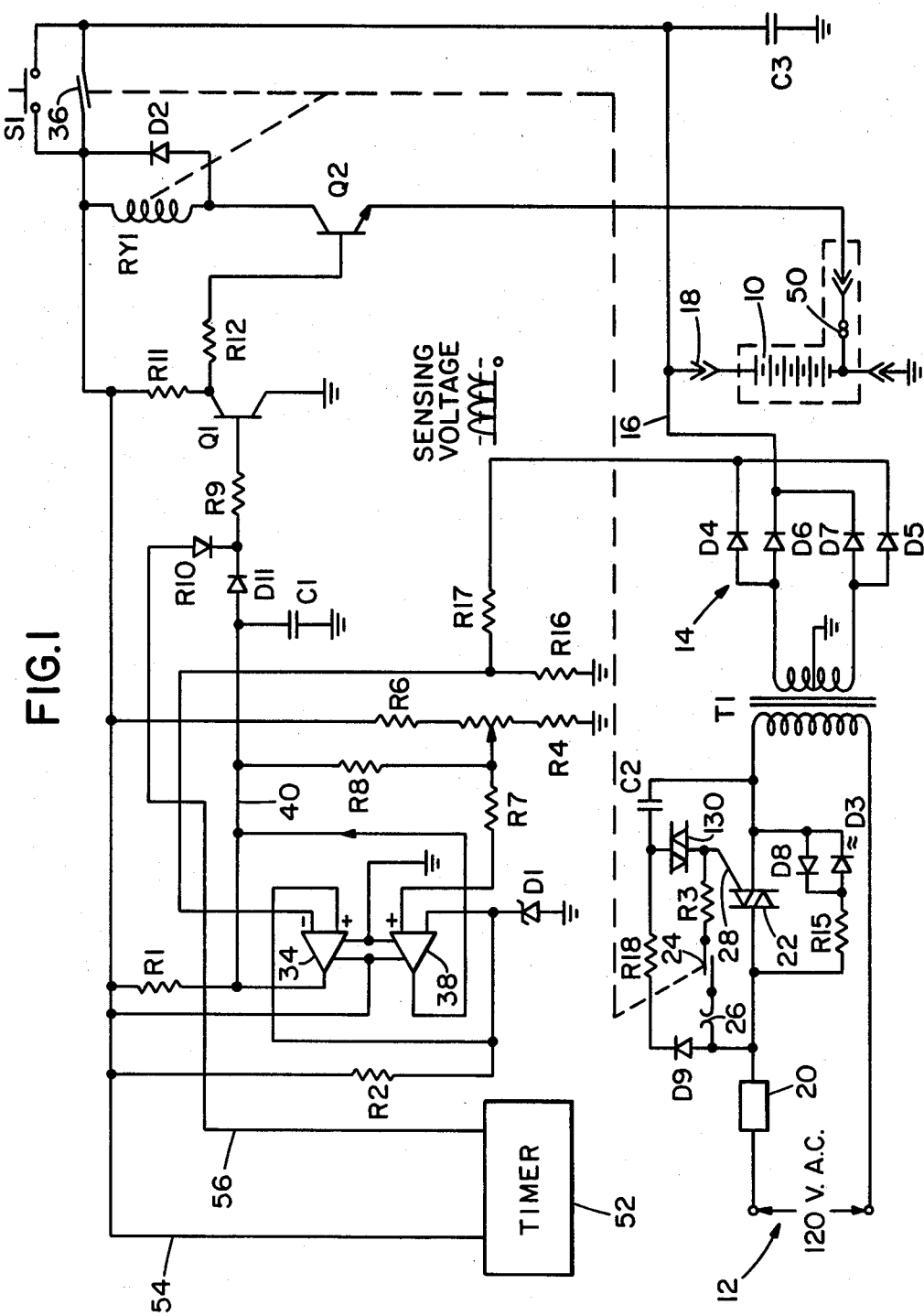
FIG. 1 is a schematic diagram of the charging circuit according to the invention.

Referring now to FIG. 1, the detailed schematic of the invention is illustrated. The battery pack to be charged is indicated at 10 and usually consists of sealed nickel-cadmium batteries of the type used in small power tools. The charging voltage for recharging the battery pack 10 is obtained from a standard 120 volt, 60 hertz outlet, as indicated at 12. This voltage is provided through the transformer T1 to a full wave rectifier circuit indicated at 14. The full wave rectifier consists of diodes D6 and D7, the output of which is provided on line 16 to a connector 18 to which the positive terminals of the battery pack 10 are connected. Line 16 is also connected to one side of the switch S1 shown in the upper right hand portion of the drawings.

Returning to the primary side of the transformer, there is provided a fusable link 20 for over current protection. In the fast charge mode voltage passes through the primary of the transformer via a triac 22. After fast charging terminates, trickle charging is employed to complete the charging process and maintain the cells at full charge. Light emitting diode D3 in parallel with the triac 22 indicates trickle charging. Diode D8 provides protection for the LED against reverse voltage.

The triac 22 is controlled by the circuit arms immediately above it in the drawing. During the fast charge mode the contacts 24 are closed. This permits current to flow through the thermostat contacts 26 and resistor R3 into the gate 28 of the triac 22. This fires the triac providing a direct path through the primary of the transformer T1.

In the trickle charge mode the contacts 24 are open and current instead flows through the diode D9 and resistor R18 to charge capacitor C2. After enough charging cycles have occurred the voltage on the capacitor C2 exceeds the breakdown voltage of diac 30 which is also connected to the gate of the triac 22. When the diac breaks over the triac is turned on applying the line voltage to the primary of the transformer for approximately one-half cycle of the line frequency, 60 Hz. The diac then ceases to conduct and the capacitor cycle begins again. This results in a very low charging current which can be applied to the cells indefinitely.

If during fast charge the transformer temperature should become excessive, the thermostatic switch 26 located on the transformer opens causing the charger to revert to the trickle charge operation by breaking the current path of the triac gate 28. When the transformer cools the thermostatic contacts 26 will close automatically permitting the system to revert to fast charge until eventually terminated by the remaining portions of the circuit.

Figure 2:
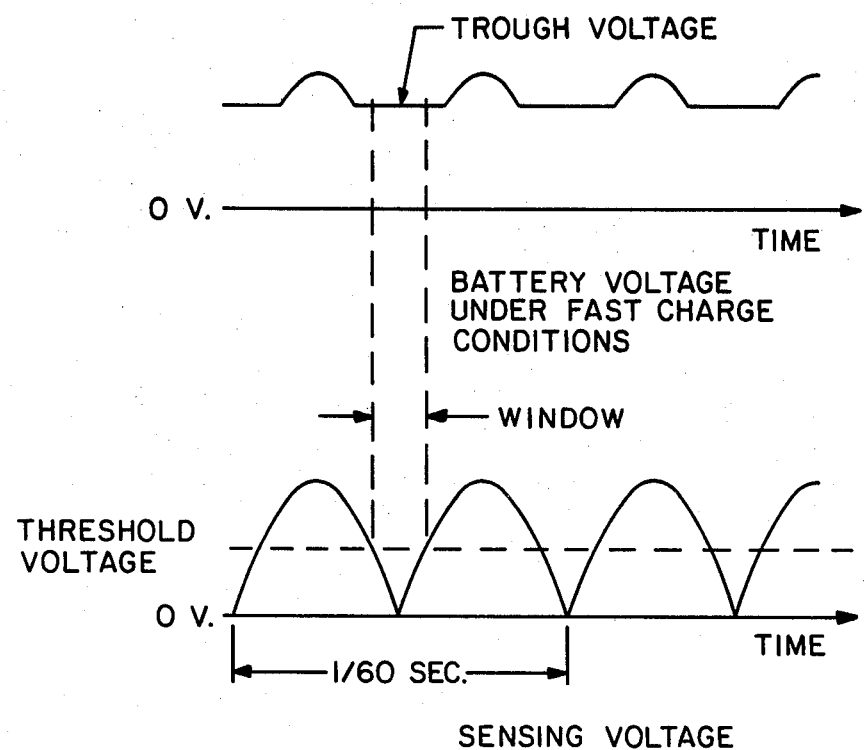
FIG. 2 are waveform drawings useful in understanding the operation of the circuit of FIG. 1.

As previously stated, the secondary of the transformer T1 includes a full wave bridge formed by diodes D6 and D7 which apply an unfiltered DC voltage to the battery pack 10 via line 16. Diodes D4 and D5 are provided to produce a sensing voltage on line 32. The sensing voltage is not the same as the charging voltage produced on line 16 but it is exactly in phase with the voltage and, therefore, is useful in determining when the trough voltage of the battery cells 10 can be measured. FIG. 2 illustrates the sensing voltage produced on line 32. The "window" defined when the value of the sensing voltage is below the threshold voltage is used to enable measurement of the trough voltage. This insures that the voltage measured is the trough voltage, not a combination of the charging voltage and trough voltage.

The sensing voltage is supplied via resistors R17 and R16 to the negative input of a first voltage comparator 34. The positive input to the comparator 34 is a reference voltage, the value of which is determined by Zener diode D1. In the present embodiment the reference voltage is 5.1 volts.

The voltage on line 16, which is either the trough voltage or the charging voltage if it exceeds the trough voltage, is applied to the positive input of a second voltage comparator 38 via the contacts 36 and resistors R4-R7. This voltage is a fraction of the battery voltage as determined by the values of resistors R4, 5 and 6, it being noted that resistor R5 is variable and can be set as appropriate. The negative input to the comparator 36 is the reference voltage supplied from resistor R2 and Zener diode D1 as was the case for the comparator 34.

A significant feature of the present invention is that the voltage comparators 34 and 38 have their outputs tied together in order to perform a logical ANDing function. Thus, the outputs from both comparators are provided on line 40. A common collector or pull up resistor R1 is provided for these outputs. The significance of tieing the outputs of the two comparators together can be seen in connection with the following chart.

| Output | | | | |
|---|---|---|---|---|
| Comparator 34 | 0 | 0 | 1 | 1 |
| Comparator 38 | 0 | 1 | 0 | 1 |
| Line 40 | 0 | 0 | 0 | 1 |

Comparator 34 monitors the sensing voltage shown in FIG. 2. When the sensing voltage is below a selected threshold voltage the output of comparator 34 will be high. In the event that the sensing voltage is above the selected threshold the output of comparator 34 will be low. In the case of the usual battery pack employed in power hand tools, the threshold value selected would be approximately 6 volts. Thus, when the sensing voltage was below 6 volts the output of comparator 34 would be high.

Comparator 38 monitors the trough voltage which appears on line 16 whenever the charging voltage is below the battery voltage. Comparator 38 will produce a high output whenever the voltage applied to its positive input is greater than the threshold voltage. Otherwise, its output will be low. In the case of the usual battery pack employed in hand operated power tools, it is necessary to discontinue charging when the trough voltage is approximately 9 volts. That is, when the trough voltage is 9 volts or greater, it is desired to discontinue charging in order to prevent heat or other damage to the cells. For such an application the values of the resistances are R4–R7 so that the value of the threshold voltage is exceeded when the trough voltage is 9 volts or greater causing the output of the voltage comparator 38 to go high.

In the illustrated embodiment a 5.1 volt Zener diode D1 is employed. The resistors R4 through R7 are then chosen and adjusted so that when the trough voltage on line 16 is approximately 9 volts a signal of approximately 5.1 volts will be produced as an input to the comparator 38. Similarly the values of R16 and R17 are selected so that the 5.1 volt threshold is exceeded when the sensing voltage is less than 6 volts.

As mentioned, the outputs of the comparators are tied together and provided to line 40. This creates a logical ANDing function so that the outputs of both comparators must be high in order to trigger the portion of the circuit which operates to switch from fast charge mode to the trickle charge mode.

When the output of comparator 34 is high, this signifies the correct time or window for measuring the trough voltage of the battery as can be seen from FIG. 2. This high output is an indication that the value of the charging voltage is below the trough voltage of the battery pack. If during this window comparator 38 is also high, then it is an indication that the trough voltage has reached its maximum desirable value and that fast charging should cease.

The output of the comparators, on line 40, is provided via resistor R9 to a transistor Q1. Transistor Q1, together with resistors R9 and R11 form an inverter circuit. The collector of transistor Q1 is connected via resistor R12 to the base of transistor Q2. Transistor Q2 is located in the output circuit which includes the coil RY1, initially activated by the switch S1. The emitter of transistor Q2 is connected to ground and to the negative terminal of the battery pack 10. A thermostatic switch 50 is provided in this circuit path for purposes to be described.

When the combined output of the comparators 34 and 38 are positive, transistor Q1 turns on. This causes its collector to go low, turning off transistor Q2. In turn, this terminates the fast charging circuit and causes operation of the circuit to switch to the trickle charge mode.

If for some reason the battery pack temperature should exceed a safe value, the thermostatic switch 50 will open with the same effect, namely, switching from the fast charge to the trickle charge mode by breaking the circuit.

Referring to the relay RY1 and the switch S1, it can be seen how fast charging is initiated. The user of the charging circuit initiates fast charge by operating the switch S1 manually. When switch S1 is closed the relay coil RY1 is pulled in, closing contacts 36 and 24 (on the transformer primary). The closing of contacts 24 fires the triac 22 applying the full line voltage to the transformer T1. Closing contacts 36 initiates charging of the battery pack and provides the reference voltage to the voltage comparator via resistor R2 and the Zener diode D1. Closing contacts 36 also, via resistors R11 and R12 provides base current to the transistor Q2 to turn it on and to latch the relay.

A timer 52 is provided against the possibility that, for unknown reasons, neither the thermostatic contacts 50 nor the voltage comparators will terminate fast charging within a reasonable period. Thus, for example, a timer 52 may be set for a time period of approximately 15 minutes which, under normal conditions, is all that should be necessary to charge nickel-cadmium batteries at the 4C rate. In this way if cold weather, a defective voltage comparator or other malfunction or adverse environmental condition should prevent termination of the fast charge mode, the timer will do so within 15 minutes. The timer is reset and powered up at the time that contacts 36 are closed via line 54. When the timer times out, the signal is provided on line 56 through diode D10 to resistor R9 which signal has the same effect as the signal from line 40 of the voltage comparator, namely, turning Q1 on which, in turn, turns Q2 off. Diodes D10 and D11 are provided to isolate the timer output from the output of the voltage comparators.

Thus, if switch S1 is operated, fast charging is initiated and will continue until one of the following three events occur: (1) the outputs of the two voltage comparators go high indicating that the trough voltage of the cells have reached a selected threshold value; (2) the thermostat 50 detects excessive cell temperature requiring cessation of fast charging; (3) after an appropriate interval, the timer 52 will discontinue charging.

The capacitor C3 is provided as a transient suppressor. If the battery should be disconnected from the circuit while in the fast charge mode, a large current may be flowing into the battery from the transformer. If so, a large inductivity induced voltage would be produced. This voltage could destroy some of the circuit components. Capacitor C3 prevents this from occurring.

When fast charging is to be terminated for any one of the three reasons previously indicated, this is accomplished by de-energizing the relay RY1 permitting contacts 36 and 24 to open. When contact 24 opens the triac is no longer fired directly by the 120 volt input voltage. The only manner of firing the triac when contacts 24 are open is via resistor R18, capacitor C2 and the diac 30. As previously stated, these fire triacs approximately ten times per second for one-half of the line voltage cycle. This operation is sufficient for trickle charging and can be maintained indefinitely without damage to the battery cells.

OPERATION OF THE CIRCUIT

From the foregoing description of the circuit components the operation of the circuit will be apparent to those skilled in the art. However, to insure completeness of the disclosure, the following brief operating description of the circuit will be given.

The charger circuit is plugged into a 120 volt, 60 Hertz standard voltage outlet and the battery pack to be charged is connected between line 16 and the emitter of transistor Q2 as indicated in the drawing. At this time if switch S1 has not been actuated, trickle charging will begin by virtue of capacitor C2 charging up and firing the diac 30 via resistor R18 and the gate 28 of the triac 22.

When it is desired to initiate the fast charging cycle, switch S1 is actuated by the user. This activates and latches the coil RY1 causing contacts 24 and 36 to close. The triac is then fired via the thermostatic contacts 26 and resistor R3 and conducts for essentially the entire AC waveform. This voltage is applied to the primary of transformer T1, stepped down and rectified on the secondary side and applied to charge the battery pack 10.

During the fast charge mode the trough voltage is measured by voltage comparator 38 while the sensing voltage is monitored by voltage comparator 34. The sensing voltage is obtained from the diodes D4 and D5 and is exactly in phase with the charging voltage on line 16. As long as the trough voltage monitored by the comparator 38 is below a selected threshold, fast charging continues unless, of course, timer 52 times out or the thermostatic contacts 50 detect excessive cell temperature. When, however, during a window determined by the output of comparator 34, it is detected that the trough voltage exceeds the selected threshold the output of comparator 38 will go high. Of course, during the window just referred to the output of comparator 34 is also high and the combination of high outputs from both comparators is effective for turning transistor Q1 on which, in turn, shuts off transistor Q2. This results in unlatching the relay RY1 and opening contacts 24 and 36 to cause reversion of the circuit to trickle charge operation.

The same result is obtained in the event that the thermostatic contacts 50 open, namely, the coil is unlatched and the contacts opened. Similarly, should the timer 52 time out, it will operate transistor Q1 turning off transistor Q2 and unlatching the coils.

During trickle charge operation the fact that the battery is at or near its full charge is signalled to the user via the light emitting diode D3.

The following components and values are provided as exemplary of one circuit suitable for use in the invention. Obviously, different battery specifications or environmental requirements would require the selection of different component values. In addition, many different components can be utilized in practicing the present invention, as, for example, there are a number of voltage comparators on the market which are suitable for the invention as are a number of different circuit timers.

COMPONENT VALUES

D1—IN5231B
RY1—Hamlin HE422A5947 Reed Relay
T1—Transformer 486 T #25, 35 Tx2, #16, EI-93HS, M-36, Iron—0.822
THI—Thermostat Opening Temperature 95° C.±10° C.
R1, R2, R3, R17—1K
R9—12K
R10—2M,
R4—22K
R5—10K, POT
R6—18K
R7—10K
R8—1M
R15—10K
R16—5.6K
R18—1M
R11—1.5K
R12—470
R13—3.9M
C4—0.0056uf
C3—20uf
Voltage Comparators—LM393N
Q1Q2—MPS 5172
Timer—CD4541B
Triac—TECCDR Q2001L4
C1—0.1uf
C2—0.1uf While we have shown and described embodiments of this invention in some detail, it will be understood that this description and illustrations are offered merely by way of example, and that the invention is to be limited in scope only by the appended claims.

We claim:

1. A circuit for controlling fast charging of battery cells to prevent damage to said cells comprising:
   (a) charging means for producing a rectified charging voltage and applying said charging voltage to said cells,
   (b) first comparison means for detecting when the charging voltage is at or below a selected value corresponding to a minimum trough voltage value and producing an output indicative thereof,
   (c) second comparison means for detecting when the trough voltage of said cells exceeds a reference voltage corresponding to the full charge value of said cells and producing an output indicative thereof,
   (d) means responsive only to the combined outputs of said first and second comparison means for terminating charging of said cells by disabling said charging means,
   whereby fast charging is terminated only if the trough voltage exceeds said reference voltage during a time period when the charging voltage is below said selected value.

2. The circuit according to claim 1 further including timer means for terminating fast charging after the passage of a selected time interval regardless of the outputs of said comparison means.

3. The circuit according to claim 1 or claim 2 further including thermostatic contacts in thermal relation with said cells, said contacts opening if the temperature of the cells exceeds a selected value thereby to terminate fast charging.

4. The circuit according to claim 1 further including means for trickle charging said cells after termination of fast charging.

5. The circuit according to claim 1, wherein said charging means includes:
   (a) a transformer having a primary and secondary,
   (b) a controlled semiconductor switch in the primary circuit of said transformer between an AC voltage source and said transformer primary,
   (c) manually operable switch means,
   (d) relay means energized by said switch means, said relay means, when energized, operating said semiconductor switch to produce said charging voltage.

6. The circuit according to claim 5, wherein said terminating means includes means for de-energizing said relay means to interrupt the charging path.

7. The circuit according to claim 1 wherein said first comparison means includes:
   (a) means for producing a sensing voltage which corresponds in phase and form to said charging voltage,
   (b) a voltage comparator for comparing the magnitude of said sensing voltage against said selected value to obtain an indication of when the charging voltage is at or below said minimum trough voltage.

8. The circuit according to claim 1 wherein said first and second comparison means include a voltage comparator having inputs for a reference voltage and a voltage to be compared against said reference voltage, each comparator having an output on which the result of such comparison is provided.

* * * * *